(12) United States Patent
Mobley (10) Patent No.: US 10,764,061 B2
(45) Date of Patent: Sep. 1, 2020

(54) IDENTIFICATION AND INFORMATION EXCHANGE SYSTEM AND REGISTRY

(71) Applicant: Matthew Mobley, Woodstock, MD (US)

(72) Inventor: Matthew Mobley, Woodstock, MD (US)

( * ) Notice: Subject to any disclaimer, the term of this patent is extended or adjusted under 35 U.S.C. 154(b) by 177 days.

(21) Appl. No.: 16/058,611

(22) Filed: Aug. 8, 2018

(65) Prior Publication Data

US 2020/0052904 A1    Feb. 13, 2020

(51) Int. Cl.
*H04L 9/32* (2006.01)
*H04L 29/06* (2006.01)
*G06Q 20/38* (2012.01)

(52) U.S. Cl.
CPC ......... *H04L 9/3247* (2013.01); *G06Q 20/382* (2013.01); *H04L 9/321* (2013.01); *H04L 9/3226* (2013.01); *H04L 63/0442* (2013.01); *H04L 63/123* (2013.01)

(58) Field of Classification Search
CPC ... H04L 9/3247; H04L 63/123; H04L 9/3226; H04L 9/321; H04L 63/0442; H04L 63/12; H04L 63/0428; G06Q 20/382
See application file for complete search history.

(56) References Cited

U.S. PATENT DOCUMENTS

| | | | | |
|---|---|---|---|---|
| 6,959,382 B1* | 10/2005 | Kinnis | .................. | G06F 21/602 |
| | | | | 713/168 |
| 2002/0174066 A1* | 11/2002 | Kleckner | ............... | G06Q 20/04 |
| | | | | 705/39 |
| 2006/0080263 A1* | 4/2006 | Willis | ..................... | G06F 21/33 |
| | | | | 705/76 |
| 2018/0181964 A1* | 6/2018 | Zagarese | .......... | G06Q 20/40145 |

\* cited by examiner

*Primary Examiner* — Ali S Abyaneh
(74) *Attorney, Agent, or Firm* — Laubscher & Laubscher P.C.

(57) ABSTRACT

A computer-implemented method for completing transactions includes a first user creating and encrypting a message with an identifier associated with a second user. The first user then digitally signs the message with the encrypted message and a privately held key. From there, an exchange record is created which includes an identifier associated with the first user, an identifier associated with the second user, the encrypted message, and the digital signature of the first user. The second user validates the exchange record and decrypts the message by providing a privately held key that is associated with the second user's identifier. A verification record, which includes the identifier of the second user, the identifier of the first user, the encrypted message, and a digital signature of the second user, is then created. The exchange record and verification record together constitute a completed transaction.

19 Claims, 8 Drawing Sheets

| SENDER KEY | RECEIVER KEY | ENCRYPTED MESSAGE | SIGNATURE |
| RECEIVER KEY | SENDER KEY | ENCRYPTED MESSAGE | SIGNATURE |
|---|---|---|---|
| ABC123 | XYZ123 | ENCRYPTED MESSAGE A | SENDER SIGNATURE |
| XYZ123 | ABC123 | ENCRYPTED MESSAGE A | RECEIVER SIGNATURE |
| DEF123 | UVW123 | ENCRYPTED MESSAGE B | SENDER SIGNATURE |
| UVW123 | DEF123 | ENCRYPTED MESSAGE B | RECEIVER SIGNATURE |
| GHI123 | RST123 | ENCRYPTED MESSAGE C | SENDER SIGNATURE |
| RST123 | GHI123 | ENCRYPTED MESSAGE C | RECEIVER SIGNATURE |

IDENTIFICATION AND INFORMATION EXCHANGE SYSTEM AND REGISTRY

BACKGROUND OF THE DISCLOSURE

The present disclosure relates to individual identification and the exchange of information, and more specifically to digital identifiers and information exchanged over networks.

The identity of the individual is one of the most valuable currencies in today's marketplace. Identity allows a business to develop rich intelligence on an individual in order to increase the likelihood that the individual will transact with the business. Success in today's marketplace is impacted by how well a business manages identity as a way to describe, understand, and transact with a consumer. In today's world the individual has little control over the identifiers used to describe him or herself. This lack of control is further magnified by a complex web of mechanisms that are independently managed by each organization with which an individual interacts. Furthermore, the consumer is solely reliant on these organizations to honor privacy requests. The consumer has few ways of actively ensuring that privacy requests are honored.

An individual's identity includes a multitude of different signals. For example, there are physical signals like an individual's first and last name, a street address, or a business' name. There are also device signals and digital signals, for instance browser cookies, phone numbers, physical device identifiers, email addresses, user names, and avatars.

These signals have varying degrees of accuracy, and the combination of signals provides varying levels of certainty relative to whom you are interacting. As examples, financial transactions may require more physical signals than device and digital signals, and website personalization may only require a device signal to personalize the content. The identity of an entity is a complex web of identity signals that lacks commonality across entities. This lack of commonality prevents the creation of processes that could create better control for all entities and efficiencies in the associated processes.

The current methods for identifying and trusting individuals and businesses benefits those entities that provide services rather than those consuming services. This method forces an individual or business to either participate in services and provide private identifiers—with the hope that the entity in control of those identifiers will not exploit the information and will keep it safe—or those individuals have to refuse to use such services. More recently, the choice to opt out of such services has diminished, as more and more online networks and services have become integral to society and the daily life of many. The current model of collecting identifiers to authenticate users and provide individualized services incorporates inherent problems and ethical dilemmas in what to collect, how to use it, and how to protect it. As network security becomes more of an issue, providing these identifiers to more and more entities threatens to diminish if not end privacy and identity threats.

SUMMARY OF THE DISCLOSURE

Accordingly, it is an object of the present disclosure to provide a system for secure, trusted digital transactions without the need for users to divulge, and in turn risk compromising, personal identity.

This is accomplished with a computer-implemented method for completing transactions between two users. First, a user creates and encrypts a message. The message is encrypted with an identifier associated with a second user who will receive the message. Once encrypted, the first user digitally signs the message with the encrypted message and a privately held key. Then the first user sends the message to a processor where an exchange record is created and placed on a registry. The exchange record includes an identifier associated with the first user (also referred to herein as the "sending user" and "sender"), the identifier associated with the second user (also referred to herein as the "receiving user" and "receiver"), the encrypted message, and the digital signature of the first user. Once the exchange record is created, the receiving user can query the registry for any exchange records that include the receiving user's identifier. The receiving user can then validate the record. The exchange record is validated with the identifier of the sending user. If that identifier is properly associated with the privately held key of the sender, then the message will be validated. The receiving user can then decrypt the message by providing a privately held key that is associated with the receiving user's identifier. Once the exchange record is validated, that validation is sent to the processor and a verification record is created on the registry. The verification record includes the identifier of the receiving user, the identifier of the sending user, the encrypted message, and a digital signature of the receiving user. The combination of the exchange record and verification record on the registry constitutes a completed transaction for review by third parties and for use during future transactions.

BRIEF DESCRIPTION OF THE FIGURES

Other objects and advantages of the disclosure will become apparent from a study of the following specification when viewed in the light of the accompanying drawing, in which.

DETAILED DESCRIPTION

The use of the term "user" or "users" are to be construed to cover an individual person, a business entity, a client-side computing device, or the like. The term "message" refers to any information, data, request, or the like that is digitally sent or received or in any way is a part of a digital transaction. The term "transaction" refers to the sending and/or receiving of a message. The term "device" refers to any electronic mechanism that can be used to send and/or receive data over a network. An example of such devices are personal computers, cell phones, laptops, tablet computers, e-book readers, wearable electronic devices, and the like, which when referenced by name are used to refer to any of the foregoing devices. The term "processor" refers to a computing device that can receive, interpret and execute computer-readable code.

The preferred process of the present disclosure relates to privately and securely exchanging a message between two users. The process and system require that users create and share distinct identifiers. These identifiers can be used by other users to locate a user and share a message with the user. Preferably, the identifiers are arbitrary and dissociate the user from any personal identifiers such as name, birth date, social security number, address, or other similar personal identifiers. The remainder of this disclosure contemplates the use of such arbitrary identifiers. However, it will be understood that the identifier need not be arbitrary for use with the process and system disclosed herein.

This process removes the need for users to provide personal identifiers to exchange a message, but also facilitates a user's ability to assess risk and trustworthiness of exchanging a message with another user. Users will not need to provide personal identifiers, reducing, if not eliminating, the risks associated with having those identifiers inadvertently disclosed through a data breach. Through use of the identifiers and the exchange system as disclosed herein, users can build trust in identifiers and transact with other users securely, while at all times placing control of identity with the user. If at any time a user wishes to discontinue use of an identifier, the user can create a new identifier. The user will not have to be concerned with any personal association that carries over from the previous identifier to the new one.

Figure 1:
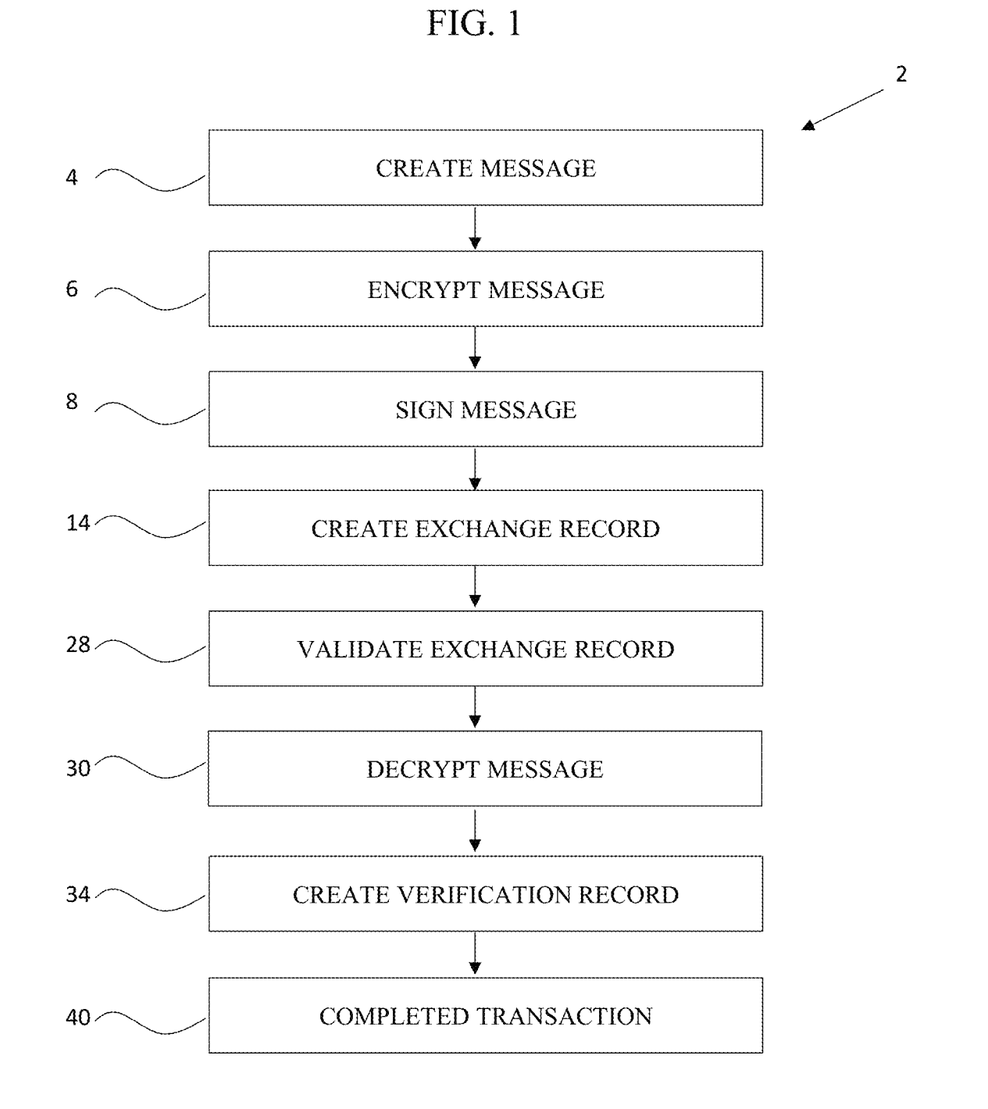
FIG. 1 is a flow chart of the exchange process disclosed herein.
Figure 2:
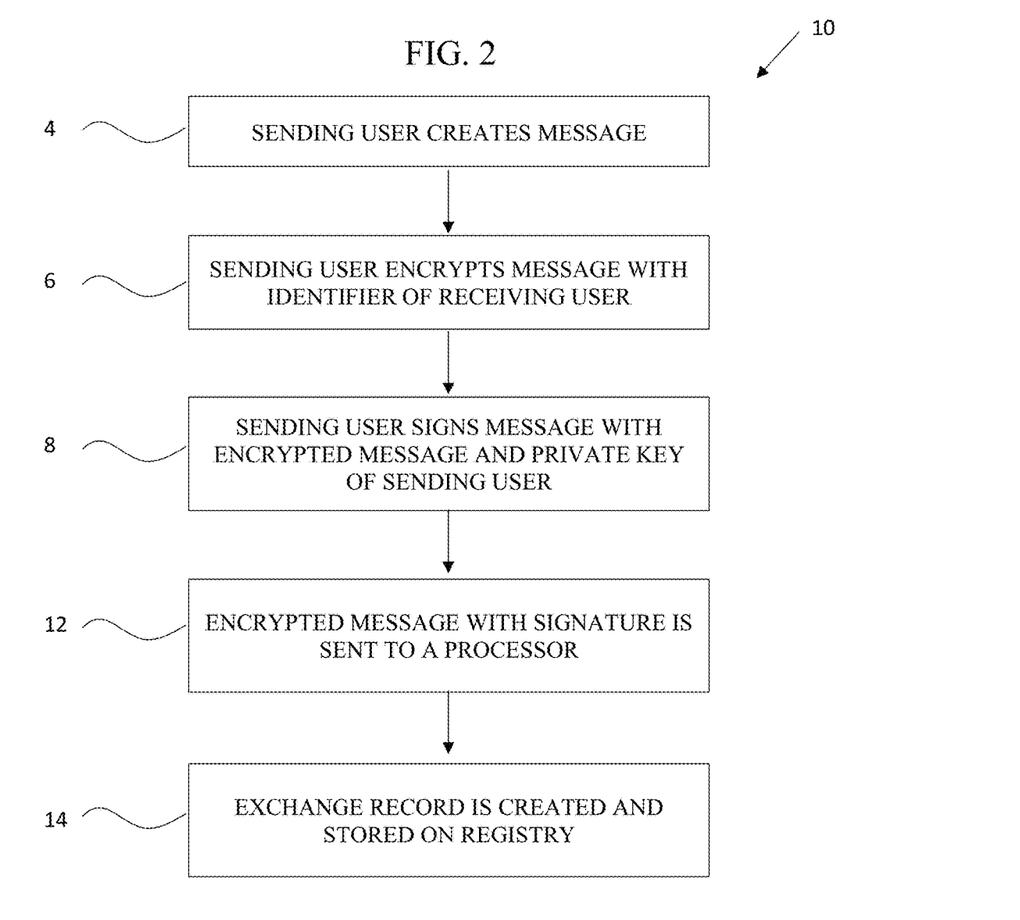
FIG. 2 is a flow chart for the steps performed by a user sending a message to a second user.

Referring now to FIG. 1, the process 2 begins when a first user creates a data message 4 that he or she wishes to send to a second user. It is contemplated by this disclosure that such messages will be created on a client device and sent via a network to a processor. Once the message is created, the first user encrypts 6 and signs 8 it. FIG. 2 shows in detail the exchange process 10 for creating 4, encrypting 6, signing 8 the message and creating an exchange record 14. The first user encrypts the message 6 with the identifier of a second user by whom the message will be received, and signs the message 8 verifying that it comes from the first user. This process can be executed by the first user or it can be executed by computer-readable instructions accessed by the device. To sign the message, the first user uses a personal privately held key and the encrypted message. The privately held key is one key in a public-private asymmetric encryption system. The user's identifier is the public key in the asymmetric encryption system.

Figure 3:
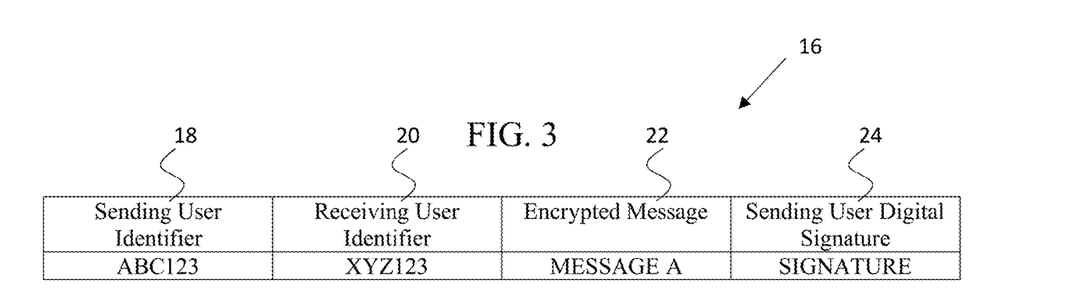
FIG. 3 is an exchange record as recorded in a registry.

Once signed, the first user sends the data to a processor 12, either by choice or automatically according the computer-executable instructions, which, through computer-executable instructions, creates an exchange record 16 on a registry that is communicatively coupled to the processor. The registry can be stored on a public or private network. As shown in FIG. 3, the exchange record 16 includes the identifiers of the first 18 and second 20 user, the encrypted message 22 sent by the first user, and the digital signature of the first user 24. The exchange record is searchable by a user or by computer-readable instructions stored on the processor.

Figure 4:
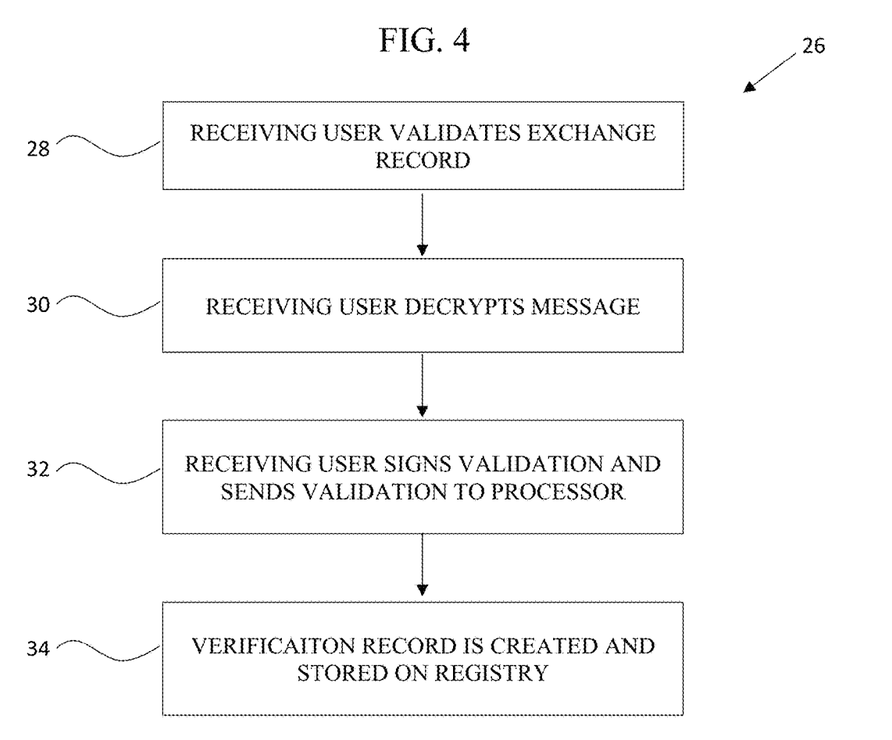
FIG. 4 is a flow chart for the steps performed by a user receiving and validating a message.

Referring to FIGS. 1 and 4, the verification process 26 once the exchange record is created 14, the second user reviews and validates the exchange record 28 and creates a verification record 34 to match the exchange record. Validation ensures that the exchange record was created with the private key of the sending user, increasing trustworthiness and security of the process. The exchange record can be received by searching the registry for any records that match the second user's identifier. This can be done manually or automatically through computer-readable instructions. The exchange record could also be received by other processes or devices. For instance, it could be sent by the processor or the first user.

Figure 5:
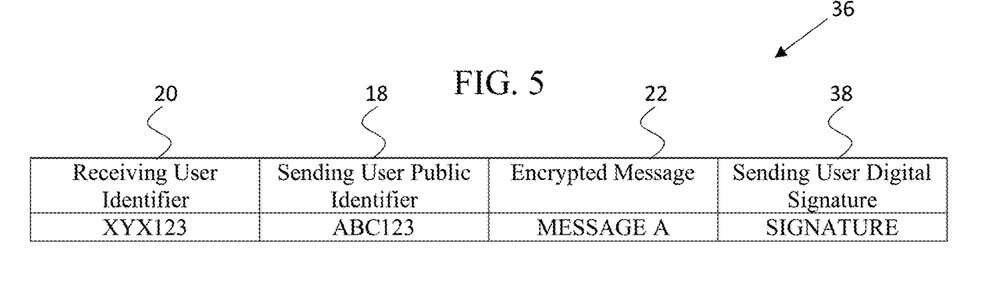
FIG. 5 is a verification record as recorded in a registry.

The second user validates the exchange record 28 with the identifier of the first user. If the identifier of the first user matches the first user's privately held key, then the exchange record is validated. The validated record is then sent to the processor 32, either manually by the second user or automatically according the computer-executable instructions. Once the validation record is sent to the processor, a verification record is created 34 and placed on the same registry as the exchange record. Preferably, the verification record is located directly after the exchange record, but it will be understood that the two records could be separately located on the registry. At any time following validation of the exchange record, the receiving user can decrypt the message 30 by using a personal privately held key. The verification record 36 includes the identifiers of the second 20 and first 18 user, the encrypted message 22 from the first user and a digital signature of the second user 38. An example of one verification record is shown in FIG. 5.

Figure 6:
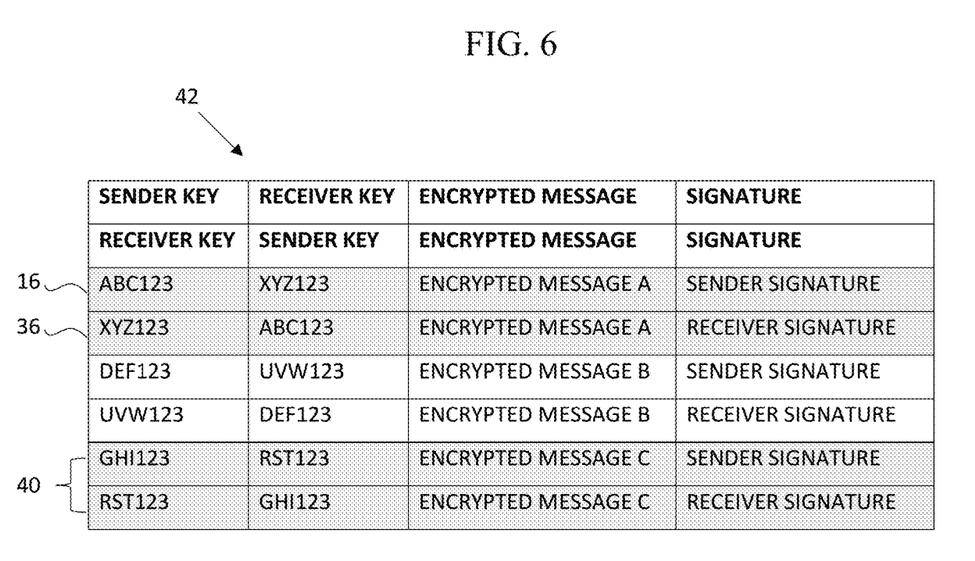
FIG. 6 is a flow chart for the potential steps performed during the exchange process.

The combination of the exchange record 16 and the verification record 36 constitutes a completed transaction 40 and demonstrates to anyone searching the registry that the transaction between the first user and the second user was successful. FIG. 6 is an example of completed transactions on a registry 42. Completed records 40 are used within the system and by users of the system to determine the validity and trustworthiness of another user and to assist one user in determining whether it wants to transact with another.

The system facilitates transactions in a number of ways. If a user has numerous successful transactions associated with the user's identifier, then other users will likely be more willing to transact with that user. By way of example, a user might have the identifier ABC123 that it uses to transact with other users over a registry related to the exchange of medical records. ABC123 might make a request to a second user, XYZ123, to send personal medical records for review. The second user can search the registry to determine if ABC123 has transacted with other users and if so, whether those transactions have been completed. Neither ABC123 nor XYZ123 needs to divulge personal information over the network to verify the identity of the other. When XYZ123 receives the request to send the information, XYZ123 can analyze the risks of sending a message to ABC123 by referencing complete or incomplete transactions on the registry.

Users can measure the trustworthiness of other users in multiple ways. One simple method is for an individual to share his or her identifier with another individual. The second individual then knows that when it receives data from a first identifier that the identifier is associated with the first individual. For instance, as with the example above, if the individual associated with XYZ123 is a patient who previously met with her doctor and the doctor requested that she share medical records via a relevant registry, and in doing so provides the doctor's ABC123 identifier to the patient, then the patient would need to do little else to validate that ABC123 is in fact her doctor. The patient will trust that she is sending her records to her doctor.

If that form of direct validation is not available or not preferable, a first user could validate a request from a second user based on past transactions associated with the identifier of the second user. For instance, if the patient of the scenario above receives a request to share medical records from the identifier ABC123 but is unsure if ABC123 is in fact her doctor or is possibly a nefarious entity wishing to obtain her sensitive information, the patient can search the relevant registry for past transactions involving ABC123. If, for instance, ABC123 has hundreds or thousands of completed transactions, which demonstrates that other users have trusted and validated ABC123, then the patient can be confident that the sender can be trusted. Alternatively, if ABC123 has few transactions or if a number of transactions are incomplete, then the patient may require additional information before sending a message to ABC123, or might decide not to transact with ABC123 at all.

A third form of measuring trustworthiness is similar to the previous one but may include specific past transactions. For instance, if the patient in the examples above has transacted with a number of other doctors, hospitals, or similar entities that use the system and registry and have their own distinct identifiers, she could search the registry to see if ABC123 has also transacted with the identifiers of those other entities. If so, the patient can trust that if those entities trust ABC123, then she can also trust ABC123.

The examples of measuring trust as disclosed above could be used on their own or in combination, and are only meant to provide examples of how one user could validate the trustworthiness of another user. Further, the example of a doctor and patient is only meant to demonstrate a scenario in which the process and system disclosed herein could be used. Other forms of digital transactions and other methods for measuring trustworthiness of an identifier could be used. For instance, a website could validate a user based on a personal identifier, whether universal or specific to the site, which could result in divulging sensitive information to the user or recording a user's website preferences. The scenario detailed above includes human interaction and human activities; however, the transactions could be purely digital and be between two computers. What is critical, is the process for recording and validating transactions and assessing trustworthiness based on those transactions. Any scenario in which data is transmitted over a network could use the process and system disclosed herein to keep track of transactions and assess trustworthiness associated with an identifier.

Figure 7:
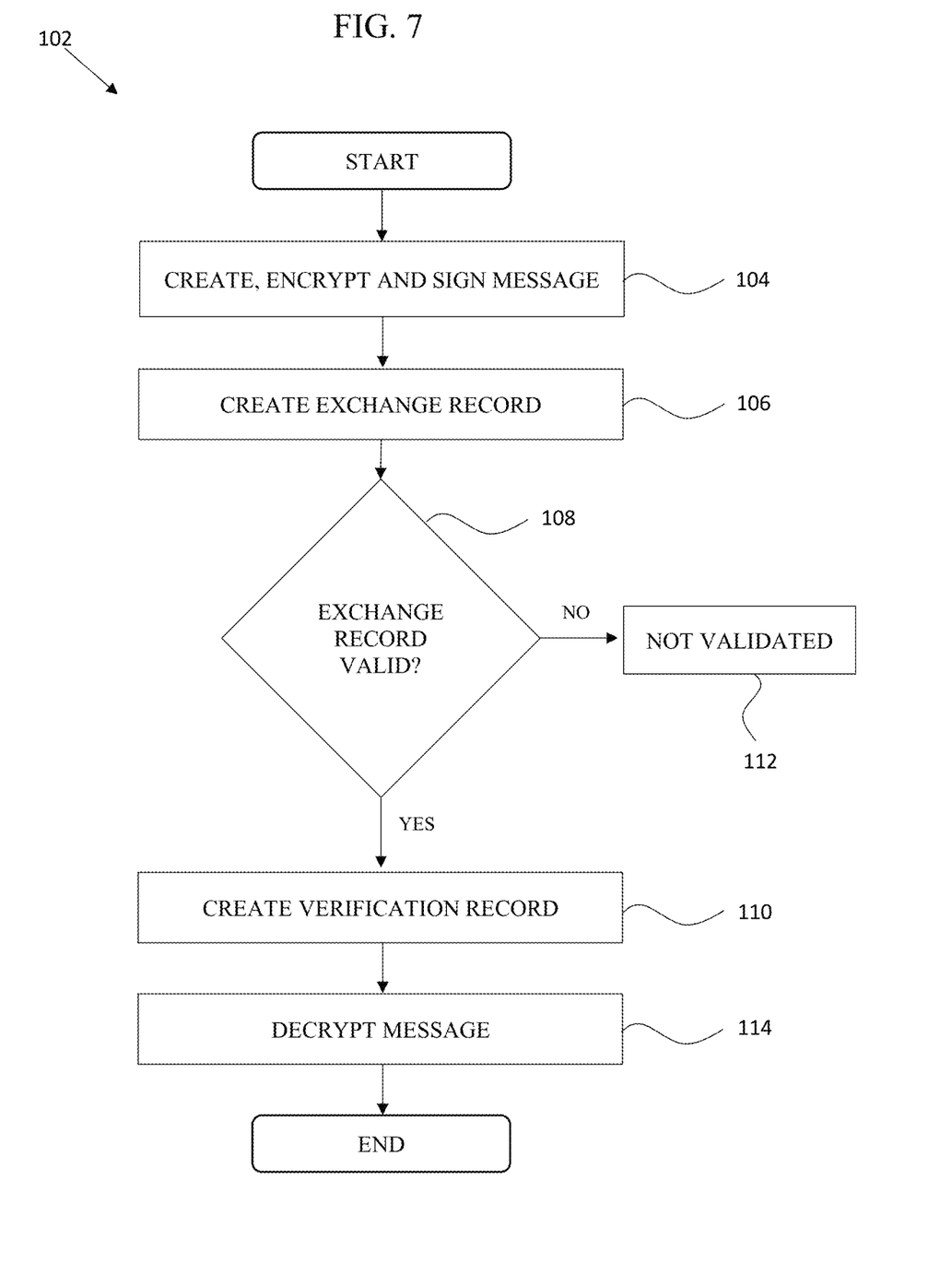
FIG. 7 is an example of a registry that maintains exchange and verification records.

Referring now to FIG. 7, the process 102 for how a message can be exchanged and recorded according to the present disclosure is detailed. A user starts by first having an identifier, then by creating, encrypting and signing a message 104, as with the processes detailed above. The exchange record is then created 106 and placed on a registry. The exchange record is created and placed on the registry without review by another user, thus anyone, including a nefarious actor, could create a record and request data from another user. Only if that record is validated by a receiving party 108 will a verification record be created 110, and the entire completed transaction be recorded. If the exchange record is not validated 112, then a verification record will not be created, and the transaction will not be completed. This will lower the trustworthiness of the identifier and thus the user associated with that identifier. At any time following validation, the user can decrypt the message 114 and review its contents.

By way of example, if the receiving party enters the identifier of the sending party, which doubles as the public key for the sending party, in an attempt to validate the record, but the key doesn't match with the privately held key associated with the identifier, then the transaction will not be valid, and a verification record will not be created. This is one layer of security provided by the method. Further, the receiving entity can determine if the sending entity is trustworthy based on any validation method as described above, providing another layer of security for the receiving entity. Only if the exchange record is validated and the receiving party initiates the creation of a verification record will the transaction be completed. If it is completed, that transaction can be used by other users during subsequent transactions to assist in determining the reliability of transacting with either of the users to that transaction.

As discussed above, the purpose of the methods and system disclosed herein is to provide secure, trustworthy transactions without the need for users to disclose personal identifiers. The exchange and verification record are integral to a system for building trust through completed transactions, and the arbitrary identifier allows for a user to transact without risk of divulging sensitive information. At any time, a user could create and use a new dissociated identifier.

Figure 8:
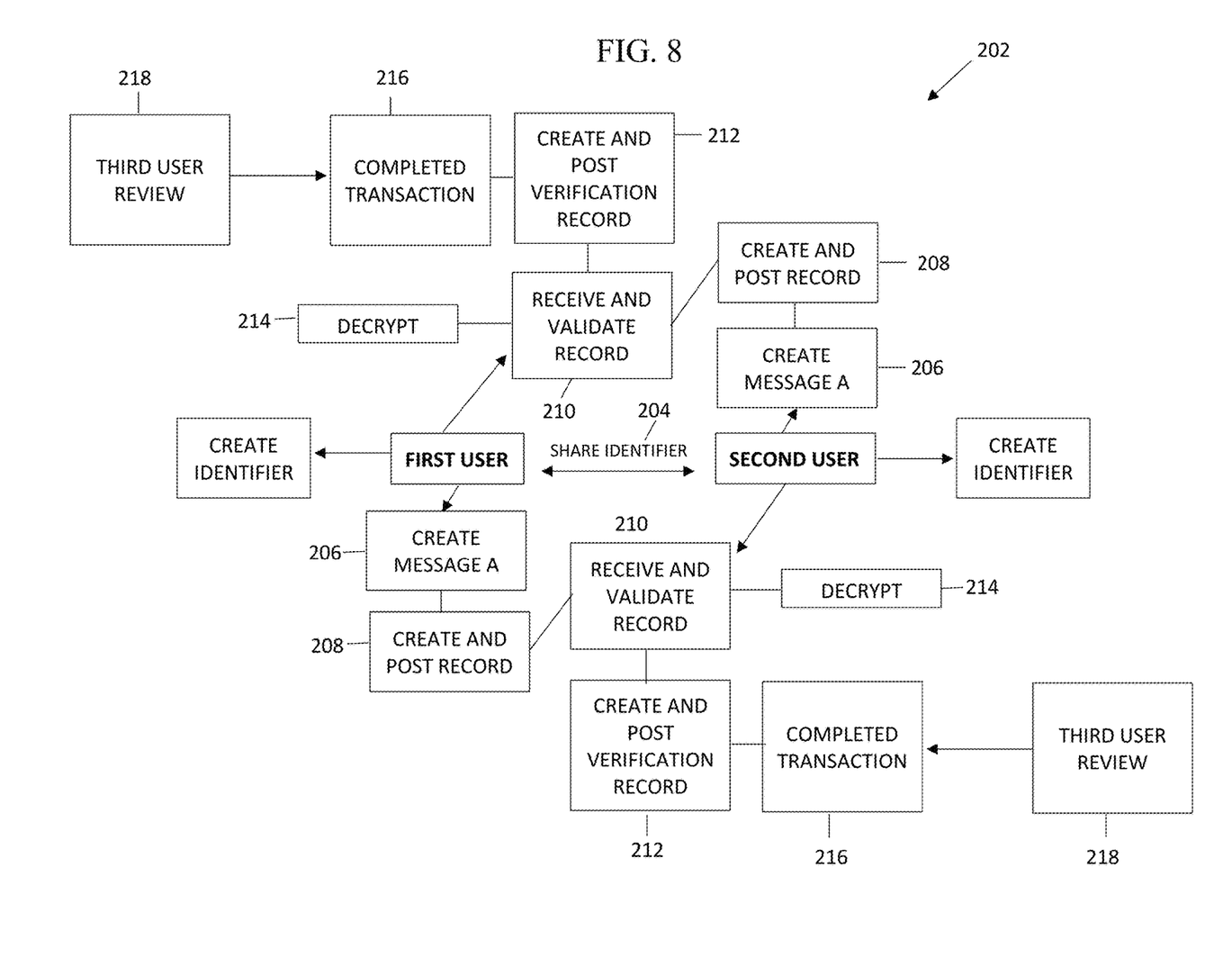
FIG. 8 is a schematic diagram for the exchange process between two users.
Figure 9:
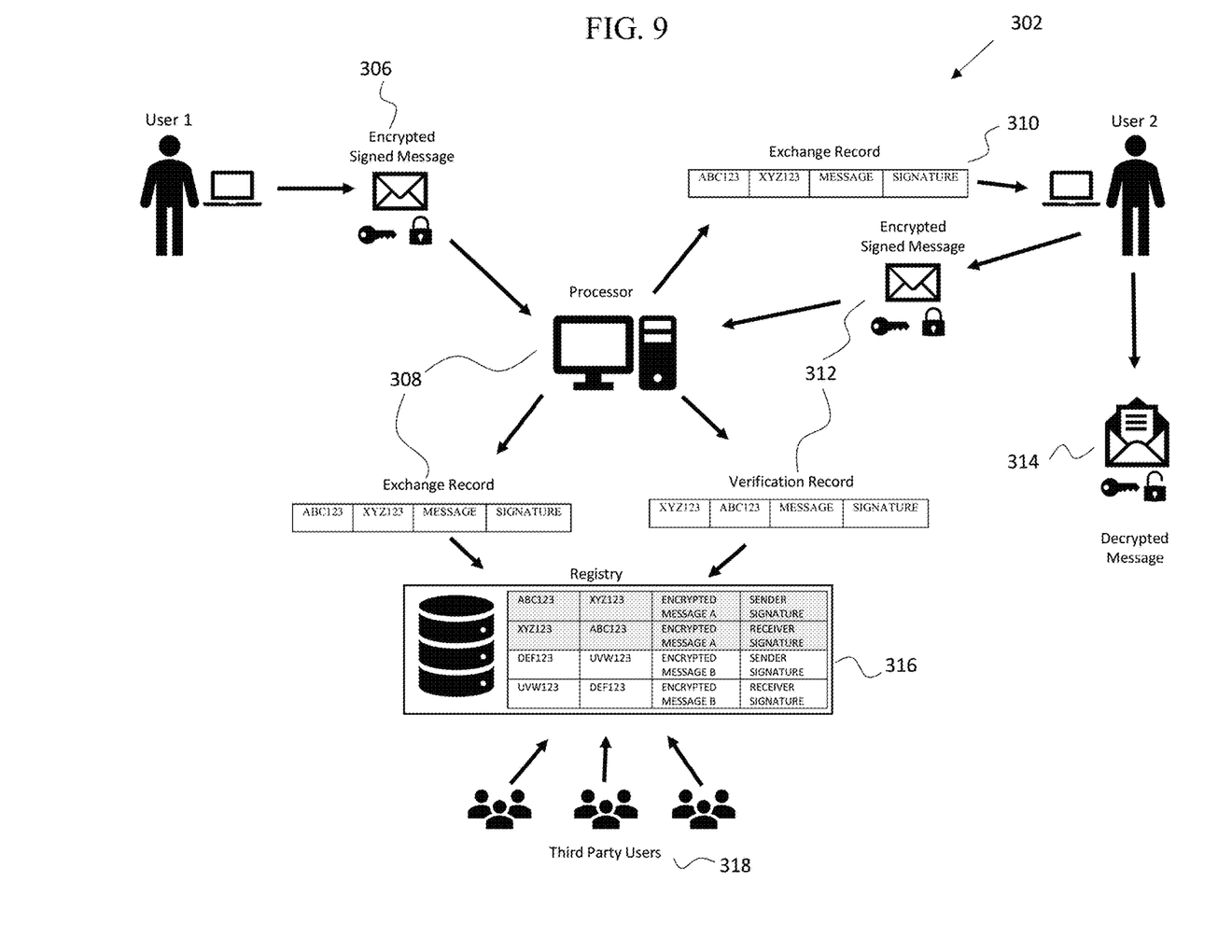
FIG. 9 is an alternate schematic diagram demonstrating the exchange process.

FIGS. 8 and 9 are alternate embodiments for the process and system 202, 302. First, the users would share their identifiers 204 with each other. Then, at any time thereafter, a first or second user could create and encrypt a message 206, 306 and send the message to a processor for creation and posting of an exchange record 208, 308 on a relevant registry 316. The message is signed by the user and sent to a processor for the exchange record to be created. The exchange record is received 210, 310 by the other user for review and validation. If validated, the validation is sent to the processor for creation and posting of a verification record 212, 312 on the same registry. The validation might be automatically sent once the message is validated. At any time following validation, the receiving user can decrypt the message 214, 314.

The two posted records constitute the completed transaction 216, which a third user could search and analyze 218, 318 if and when that user is considering transacting with the first and/or second user. As is shown in FIG. 8, the second user could also create a message and create and post an exchange record for which the first user could validate and create and post a verification record. The system disclosed herein allows any user to initiate a transaction with another user so long as the users have shared their identifiers with each other, which could be the result of users publicly sharing their identifiers with any user interested in finding it.

Figure 10:
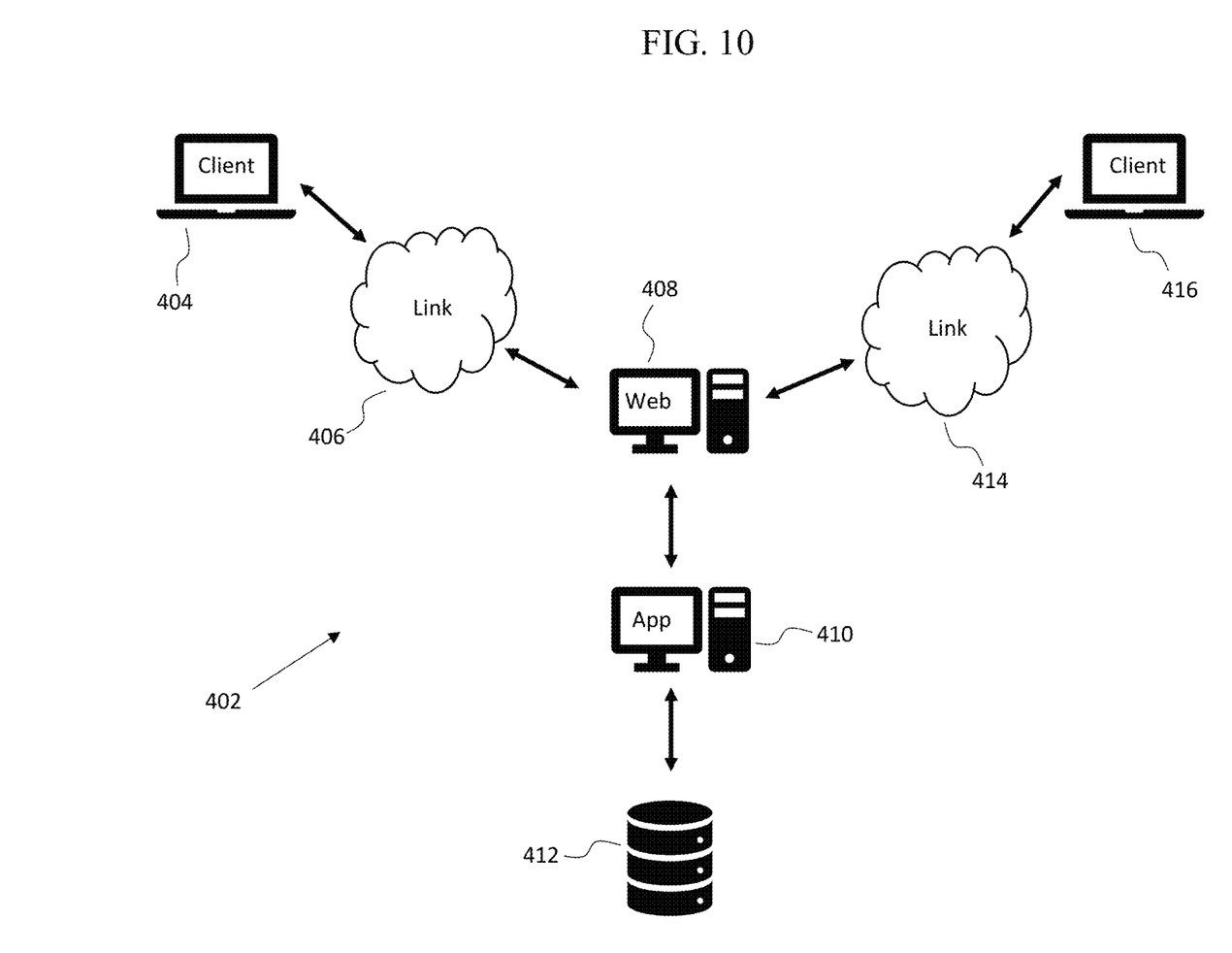
FIG. 10 is a diagram of a network that can be utilized by the present disclosure.

FIG. 10 is one example of a digital network 402 over which the process and system disclosed herein could be executed. The network of FIG. 10 is web-based, however, it will be understood by those with skill in the art that other networks, such as, but not limited to, intranets or cellular networks could be used. There is a first electronic client device 404, a first network link 406, a web server 408, an application server 410, a database 412, a second network link 414, and a second electronic client device 416. The first 404 and second 416 electronic client devices are used for creating and receiving messages for the processes and system disclosed herein. The message is sent to a web server 408 over a first network link 406 and from there is sent to an application server 410 which carries out the processes of creating the exchange record and verification record if the message is validated and storing it on the registry located on the database 412. The servers include an operating system with executable instructions and computer-readable storage medium for storing instructions that when executed will perform the processes disclosed herein. The database 412 can be accessed by the processor to process data according to instructions provided by the processor. Such instructions might involve searching and sorting data according to identifiers to locate a record for review or when determining trustworthiness of an identifier. The database 412 can be accessed by a second client 416 over a second network link 414 to review the registry. It is contemplated by the present disclosure that more than one network, processor, and database could be utilized to store and access the registries disclosed herein. The registries may be centralized or decentralized according to the methods of creation and maintenance, whether by a single entity or over a peer-to-peer network.

Although the above description is with reference to particular embodiments, it is to be understood that these embodiments are merely illustrative of the principles and applications of the present disclosure. It is therefore to be understood that numerous modifications may be made to the illustrative embodiments and that other arrangements may be devised and employed without departing from the spirit and scope of the present disclosure.

What is claimed is:

1. A computer-implemented method for completing transactions between two users, comprising the steps of:
    (a) creating, encrypting, and digitally signing a message;
    (b) creating an exchange record on a registry prior to validating the exchange record, the exchange record including a first user identifier, a second user identifier, the encrypted message, and a first user digital signature, wherein each of the first user identifier and second user identifier include arbitrary identifiers having no association with personal identifiers of a user;
    (c) one of validating and not validating the exchange record;
    (d) decrypting the message if the exchange record is validated;
    (e) creating a verification record on the registry, the verification record including the second user identifier, the first user identifier, the encrypted message, and a second user digital signature; and
    (f) combining the exchange and verification records to create a completed transaction, wherein the completed transaction is used by a third user to determine the trustworthiness of either the first or second user.

2. A computer-implemented method for completing transactions between two users as defined in claim 1, wherein said encrypting step includes use of the second user identifier.

3. A computer-implemented method for completing transactions between two users as defined in claim 1, wherein said digitally signing step includes use of the encrypted message and a first user privately held key, said first user privately held key comprising one key of an asymmetric cryptographic key set.

4. A computer-implemented method for completing transactions between two users as defined in claim 3, wherein said validating step includes using the first user identifier, whereby if the first user identifier is associated with the first user privately held key, the exchange record will be validated.

5. A computer-implemented method for completing transactions between two users as defined in claim 4, wherein said validating step further includes the second user digitally signing the exchange record.

6. A computer-implemented method for completing transactions between two users as defined in claim 1, wherein said creating an exchange record step and said creating a verification record step are executed by a computer processor via computer-readable instructions.

7. A system for secure digital transactions, comprising:
    (a) a memory;
    (b) at least one processor connected with the memory and configured to perform the steps of:
        (1) creating, encrypting, and digitally signing a message;
        (2) creating an exchange record on a registry prior to validating the exchange record, the exchange record including a first user identifier, a second user identifier, the encrypted message, and a first user digital signature, wherein each of said first user identifier and second user identifier are arbitrary identifiers having no relevance or association with personal identifiers of a user;
        (3) one of validating and not validating the exchange record;
        (4) decrypting the message if the exchange record is validated;
        (5) creating a verification record on the registry, the verification record including the second user identifier, the first user identifier, the encrypted message, and a second user digital signature; and
        (6) combining the exchange and verification records to create a completed transaction, wherein the completed transaction is used by a third user to determine the trustworthiness of either the first or second user.

8. A system for secure digital transactions as defined in claim 7, wherein said encrypting step includes use of the second user identifier.

9. A system for secure digital transactions as defined in claim 7, wherein said digitally signing step includes use of the encrypted message and a first user privately held key, said first user privately held key comprising one key of an asymmetric cryptographic key set.

10. A system for secure digital transactions as defined in claim 9, wherein said validating step includes using the first user identifier, whereby if the first user identifier is associated with the first user privately held key, the exchange record will be validated.

11. A system for secure digital transactions as defined in claim 10, wherein said validating step further includes the second user digitally signing the exchange record.

12. At least one non-transitory computer readable storage media having executable instructions stored thereon that when executed by a computer processor perform the steps of:
    (a) creating, encrypting, and digitally signing a message;
    (b) creating an exchange record on a registry prior to validating the exchange record, the exchange record including a first user identifier, a second user identifier, the encrypted message, and a first user digital signature, wherein each of said first user identifier and second user identifier include arbitrary identifiers having no association with personal identifiers of a user;
    (c) one of validating and not validating the exchange record;
    (d) decrypting the message if the exchange record is validated;
    (e) creating a verification record on the registry, the verification record including the second user identifier, the first user identifier, the encrypted message, and a second user digital signature; and
    (f) combining the exchange and verification records to create a completed transaction, wherein the completed transaction is used by a third user to determine the trustworthiness of either the first or second user.

13. At least one non-transitory computer readable storage media having as defined in claim 12, wherein said encrypting step includes use of the second user identifier.

14. At least one non-transitory computer readable storage media having as defined in claim 12, wherein said digitally signing step includes use of the encrypted message and a first user privately held key, said first user privately held key comprising one key of an asymmetric cryptographic key set.

15. At least one non-transitory computer readable storage media having as defined in claim 14, wherein said validating step includes using the first user identifier, whereby if the first user identifier is associated with the first user privately held key, the exchange record will be validated.

16. At least one non-transitory computer readable storage media having as defined in claim 15, wherein said validating step further includes the second user digitally signing the exchange record.

17. A system for completing and maintaining secure digital transactions, comprising:
 (a) at least one database having a registry for storing exchange and verification records;
 (b) at least one processor coupled to said at least one database;
 (c) at least one completed transaction on said registry, including:
  (1) an exchange record, said exchange record created by said processor and including a first user identifier, a second user identifier, an encrypted message, and a first user digital signature, wherein each of said first user identifier and second user identifier include arbitrary identifiers having no association with personal identifiers of a user; and
  (2) a verification record, said verification record created by said processor and including the second user identifier, the first user identifier, the encrypted message of said exchange record, and a second user digital signature, wherein the completed transaction is used by a third user to determine the trustworthiness of either the first or second user; and
 (d) at least one incomplete transaction on said registry, including:
  an exchange record, said exchange record created by said processor and including a first user identifier, a second user identifier, an encrypted message, and a first user digital signature, wherein each of said first user identifier and second user identifier include arbitrary identifiers having no association with personal identifiers of a user.

18. A system for completing and maintaining secure digital transactions as defined in claim 17, wherein said database is one of a centralized and decentralized database.

19. A system for completing and maintaining secure digital transactions as defined in claim 17, wherein said verification record is on said registry directly following said exchange record.

* * * * *